United States Patent
Scott et al.

(10) Patent No.: US 10,076,978 B2
(45) Date of Patent: Sep. 18, 2018

(54) POWER LIFT AND RECLINER RELEASE/FOLD DEVICE

(71) Applicant: Ford Global Technologies, LLC, Dearborn, MI (US)

(72) Inventors: Glenn Scott, Dexter, MI (US); Richard Li, Novi, MI (US); Eric Morse, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 15/298,863

(22) Filed: Oct. 20, 2016

(65) Prior Publication Data
US 2018/0111513 A1  Apr. 26, 2018

(51) Int. Cl.
*B60N 2/22* (2006.01)
*B60N 2/02* (2006.01)
*B60N 2/30* (2006.01)

(52) U.S. Cl.
CPC ......... *B60N 2/2213* (2013.01); *B60N 2/0232* (2013.01); *B60N 2/3011* (2013.01); *B60N 2002/0236* (2013.01)

(58) Field of Classification Search
CPC .......... B60N 2/20; B60N 2/22; B60N 2/2213; B60N 2/0232; B60N 2/3011; B60N 2002/0236
See application file for complete search history.

(56) References Cited

U.S. PATENT DOCUMENTS

| | | | |
|---|---|---|---|
| 5,711,505 A | 1/1998 | Nemoto | |
| 6,158,799 A | 12/2000 | Guilford | |
| 6,382,491 B1 | 5/2002 | Hauser et al. | |
| 7,661,760 B2 * | 2/2010 | Nakaya | B60N 2/0232 297/321 |
| 7,775,594 B2 * | 8/2010 | Bruck | B60N 2/20 297/362 |
| 8,621,960 B2 | 1/2014 | Wrong | |
| 9,102,246 B2 * | 8/2015 | Blendea | B60N 2/20 |
| 9,162,591 B2 * | 10/2015 | Tame | B60N 2/20 |
| 2007/0132266 A1 | 6/2007 | Ghergheli et al. | |
| 2014/0062156 A1 * | 3/2014 | Bruck | B60N 2/0232 297/362.11 |
| 2014/0191553 A1 * | 7/2014 | Blendea | B60N 2/20 297/354.1 |

(Continued)

*Primary Examiner* — Philip F Gabler
(74) *Attorney, Agent, or Firm* — Vichit Chea; Price Heneveld LLP

(57) ABSTRACT

A vehicle seating assembly includes a seat base, a seatback, and a recliner heart. The recliner heart is rotatably coupled to the seat base and the seatback and the recliner heart is operable between locked and unlocked states. The vehicle seating assembly additionally includes an actuator having a housing defining a housing tab, a motor, a gear operably coupled to the motor where the gear defines a gear tab and a spring tab. The actuator includes an actuator return spring defining a first and second hook where the first hook is coupled to the spring tab. The actuator additionally includes a lever coupled to the gear, a pulley coupled to the gear, a lifting cable coupled between the pulley and the seatback, and a release cable coupled between the lever and the recliner heart. The release cable is configured to transition the recliner heart between the locked and unlocked states.

19 Claims, 4 Drawing Sheets

(56) References Cited

U.S. PATENT DOCUMENTS

| | | | |
|---|---|---|---|
| 2016/0016493 A1* | 1/2016 | Deppe | B60N 2/0232 297/378.12 |
| 2016/0186468 A1* | 6/2016 | Ilea | E05B 79/04 292/201 |

* cited by examiner

POWER LIFT AND RECLINER RELEASE/FOLD DEVICE

FIELD OF THE INVENTION

The present invention generally relates to a vehicle seating assembly, and more specifically, a reclining vehicle seat having a motorized actuator for raising and lowering the seatback.

BACKGROUND OF THE INVENTION

Vehicle seats generally include a reclining mechanism for selective adjustment of the angular position of the seatback relative to the seat base, allowing a user to recline or incline the seatback. Manually operated reclining mechanisms generally have a locked position, in which the seatback cannot pivot, and an unlocked position, in which the seatback can be pivoted. A user manually pulls a handle or a lever that is operably coupled to the reclining mechanism to unlock it, allowing adjustment of the seatback position. Releasing the lever relocks the reclining mechanism, thus retaining the seatback in the adjusted position. In these types of vehicle seats, the unlocked recliner seatback will typically fold forward in relation to the recliner clockspring which also acts to keep the seatback loaded against the occupant's back when the recliner is released (through the handle or lever) and the seat is occupied.

SUMMARY OF THE INVENTION

One aspect of the present invention includes a vehicle seating assembly having a seat base; a seatback; a recliner heart rotatably coupling the seat base and the seatback, wherein the recliner heart is operable between locked and unlocked states; and an actuator. The actuator includes a housing defining a housing tab; a motor; a gear operably coupled to the motor, the gear defining a gear tab and a spring tab; an actuator return spring defining a first hook and a second catch, the first hook coupled to the spring tab; a lever coupled to the gear; a pulley coupled to the gear; a lifting cable coupled between the pulley and the seatback; and a release cable coupled between the lever and the recliner heart, wherein the release cable is configured to transition the recliner heart between the locked and unlocked states.

Another aspect of the present invention includes a vehicle seating assembly having a seat base; a seatback operable between folded and non-folded positions; a recliner heart rotatably coupling the seat base and the seatback; and an actuator. The actuator includes a motor; a pulley operably coupled to the motor; and a lifting cable coupled between the pulley and the seatback, wherein the motor is configured to drive the pulley such that the lifting cable moves the seatback from the folded to the unfolded position.

Another aspect of the present invention includes a vehicle seating assembly having a seat base; a seatback; a recliner heart rotatably coupling the seat base and the seatback, wherein the recliner heart is operable between locked and unlocked states; and an actuator. The actuator includes a motor; a gear coupled to the motor; a lever coupled to the gear; and a release cable coupled between the lever and the recliner heart and configured to transition the recliner heart between the locked and unlocked states.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
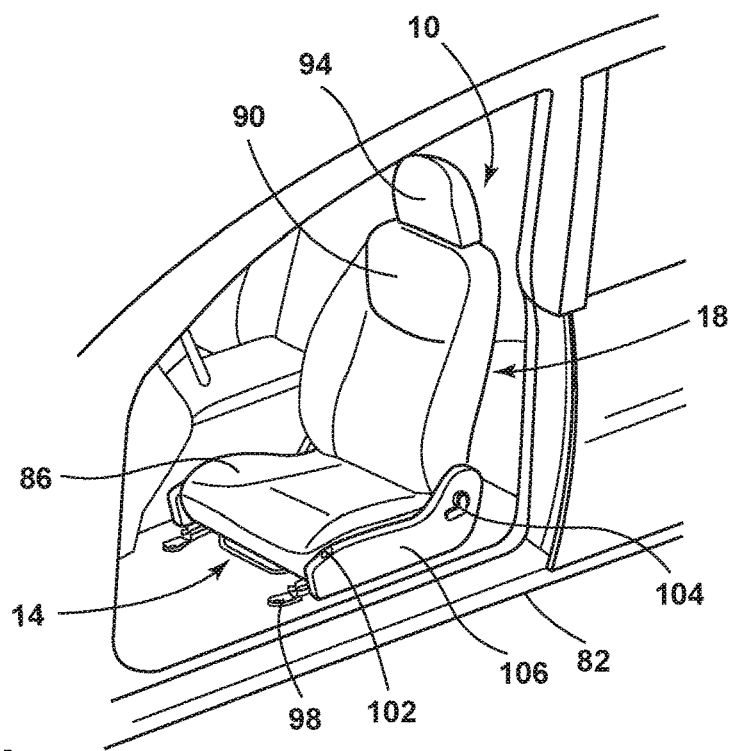
FIG. 1 is a top perspective view of a vehicle seating assembly disposed inside a vehicle with the cover shown in phantom.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5C, the reference numeral 10 generally designates a vehicle seating assembly. The vehicle seating assembly 10 includes a seat base 14, a seatback 18, and a recliner heart 22. The recliner heart 22 is rotatably coupled to the seat base 14 and the seatback 18 and the recliner heart 22 is operable between locked and unlocked states. The vehicle seating assembly 10 additionally includes an actuator 26 having a housing 30 defining a housing tab 34, a motor 38, and a gear 42 operably coupled to the motor 38 where the gear 42 defines a gear tab 46 and a spring tab 50. The actuator 26 additionally includes an actuator return spring 54 defining a first hook 58 and a second hook 62, where the first hook 58 is coupled to the spring tab 50. The actuator 26 additionally includes a lever 66 coupled to the gear 42, a pulley 70 coupled to the gear 42, a lifting cable 74 coupled between the pulley 70 and the seatback 18, and a release cable 78 coupled between the lever 66 and the recliner heart 22. The release cable 78 is configured to transition the recliner heart 22 between the locked and unlocked states.

As shown in FIG. 1, the vehicle seating assembly 10 is generally configured for use in a variety of vehicles 82 as either a front driver's seat, a front passenger's seat, and/or a rear seat of the vehicle 82 and generally includes the seatback 18 and the seat base 14, each having a cushion 86, 90, respectively. A headrest 94 may also be mounted to the top of the seatback 18. The seat base 14 may be configured to be mounted on a support surface, such as a floor pan of the vehicle 82. A track assembly 98 may be coupled to the seat base 14 to facilitate fore and aft positioning of the vehicle seating assembly 10. An actuator switch 102 is shown mounted to a side shield 106 disposed on the lateral side of the seat base 14. The vehicle seating assembly 10 is generally designed for the comfort of a passenger, as well as to accommodate and protect a passenger during a collision event. Additionally, in FIGS. 1-2, the seatback 18 is shown in a substantially upright seating position.

Figure 2:
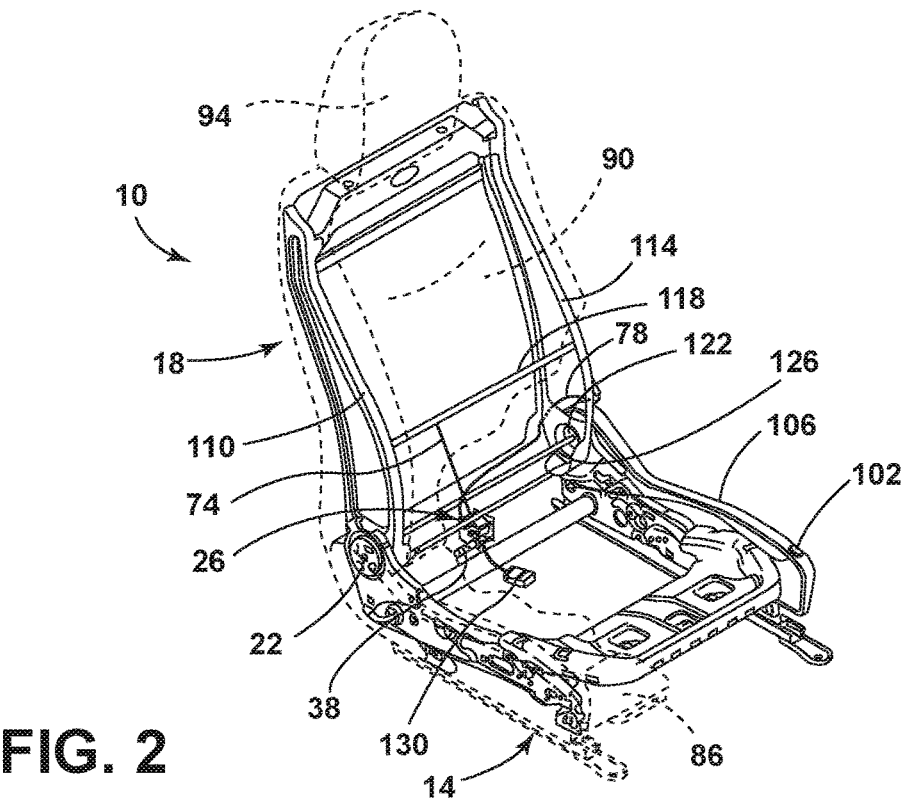
FIG. 2 is a top perspective view of the vehicle seating assembly of FIG. 1.

Referring now to FIG. 2, the seatback 18 includes a first vehicle seatback support member 110 and a second vehicle seatback support member 114, both disposed on opposite lateral sides of the vehicle seating assembly 10 and of substantially mirror image construction relative to one another. The first and second vehicle seatback members 110, 114 form a portion of the frame of the seatback 18 and are generally designed to provide substantial support to the passenger's back and to help protect a passenger during a collision event. In some embodiments, one or more lateral support arms 118 may be used to offer additional support to the frame of the seatback 18 and the passenger. Each of the first and second vehicle seatback support members 110, 114 includes a reclining mechanism aperture 122 disposed near the bottom thereof and adapted to receive reclining mechanisms 22, which are commonly referred to in the art as "recliner hearts." The recliner hearts 22 are affixed directly to the first and second vehicle seatback support members 110, 114 via laser welding, or other suitable affixing means. The recliner hearts 22 provide a direct interface between the first and second vehicle seatback support members 110, 114 and the seat base 14.

In some embodiments, the actuator 26 may have the lifting cable 74 connected to the lateral support arm 118 in order to raise the seatback 18. The actuator 26 includes the motor 38 whose amount of rotation may vary from seat to seat, depending, at least in part, on the particular recliner hearts 22 utilized with the actuator 26. For example, the motor 38 and a cross-talk shaft 126 may rotate thirty degrees (30°) to transmit torque and unlock the recliner hearts 22. Further, the motor 38 is electrically coupled to the vehicle electrical system via an electrical connector 130, which may be positioned in any suitable location within or remote from the vehicle seating assembly 10.

The motor 38 may be a servo motor or a stepper motor, though any suitable type of motor is contemplated. The motor 38 is able to accurately control the angular position of the connected seatback 18 through the lifting cable 74. As an example, the motor 38 may be an integrated stepper motor capable of a high micro stepping resolution with all the necessary controls and electronics mounted within the motor 38 itself. It is contemplated that the motor 38 is capable of delivering approximately 6 Newton-meters of torque, though the torque requirement is exemplary and is not meant to be limiting.

According to some embodiments, the actuator switch 102 is illustrated in the form of an electronic push button, though it should be understood that any suitable input device, such as a toggle switch, rocker switch, or micro switch could also be utilized. The actuator switch 102 is electronically connected to the motor 38 for selectively energizing the motor 38. The actuator switch 102 is shown mounted to the side shield 106 disposed on the lateral side of the seat base 14. The side shield 106 is primarily a decorative trim component, though it may also include a variety of apertures and connecting points for securing various mechanical devices thereto, as well as for securing the side shield 106 to the vehicle seating assembly 10. The actuator switch 102 may be mounted sub-flush to a surface of the side shield 106, thereby eliminating, or at least reducing, the possibility of inadvertently actuating the actuator switch 102. Alternatively, the actuator switch 102 could be located in other interior locations, for example, in the vehicle door, instrument panel, or any other suitably reachable location.

It is contemplated that the actuator switch 102 may be an up/down type switch, where a passenger may flip the switch in either position to energize the motor to rotate the seatback "up," or "down." In some embodiments, the actuator switch 102 may be a rocker switch having a rectangular or other shaped button. Further, the actuator switch 102 may be provided in a variety of colors and textures, may include a chrome ring or accents, and may be illuminated.

Figure 3:
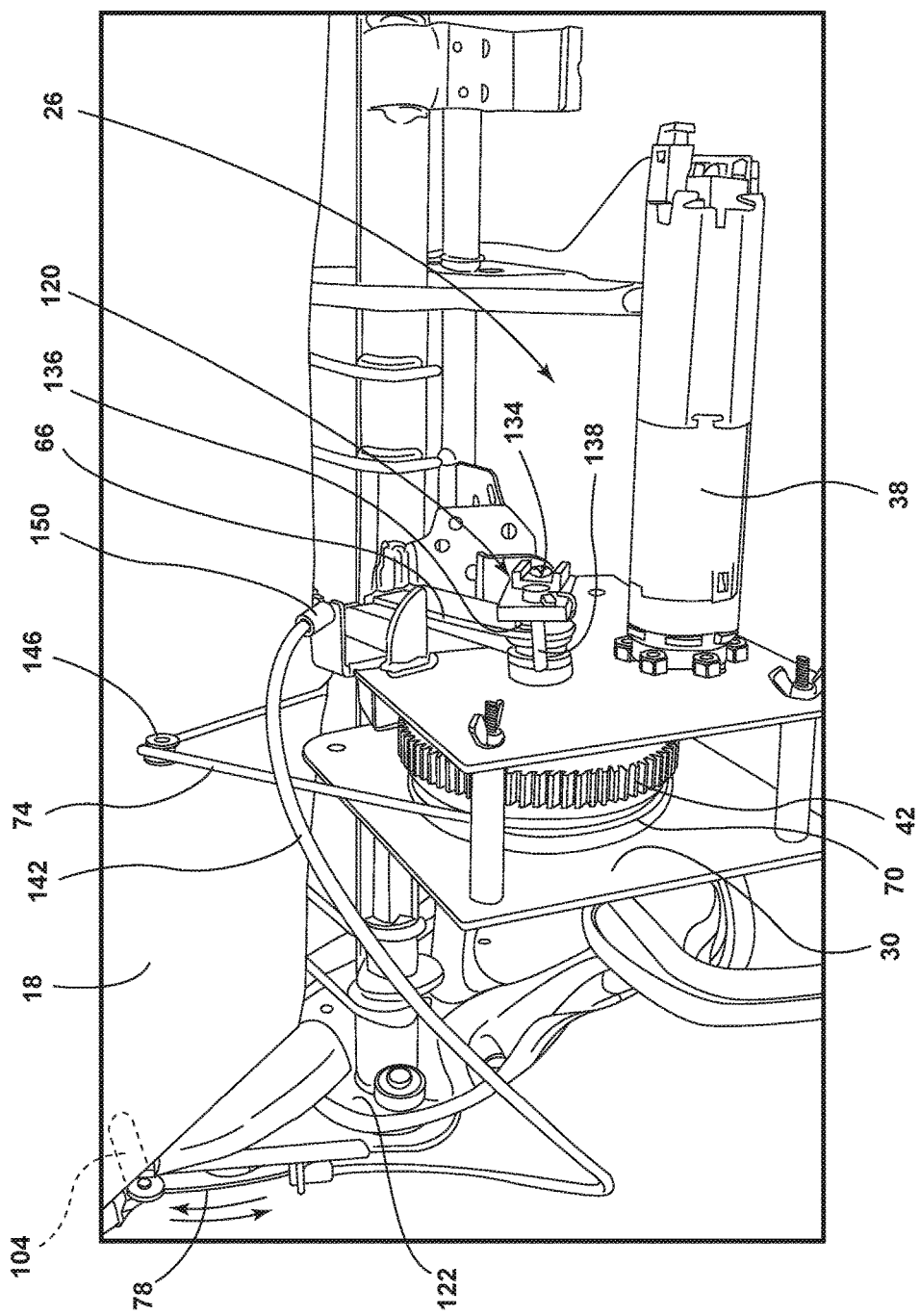
FIG. 3 is a rear perspective view of an actuator of the vehicle seating assembly shown in FIG. 1.

Referring to FIG. 3, the actuator 26 is shown having the pulley 70 and the gear 42 enclosed in the housing 30, where the motor 38 may additionally be coupled directly to the housing 30. The release cable 78 extends from the release handle 104 mounted to the reclining mechanism aperture 122 and extends through a release cable housing 142 and connects to the actuator return spring 54 (FIG. 4) at a conduit end fitting 150. The loss motion spring 136 is mounted on an axle 134 that extends through the pulley 70, the gear 42, and protrudes out through the housing 30. A reaction pin 138 is coupled to the axle 134 where the reaction pin 138 can be rotated to press against the lever 66 to pull down on the release cable 78. The lifting cable 74 is coupled and wound around the pulley 70 and the lifting cable 74 attaches to the seat back 18 around a recliner pivot 146. The lifting cable 74 may be attached to the seatback 18 through the lateral support arm 118 (FIG. 2), a plastic connector piece, a metal connector piece, and/or a receiving member.

Figure 4:
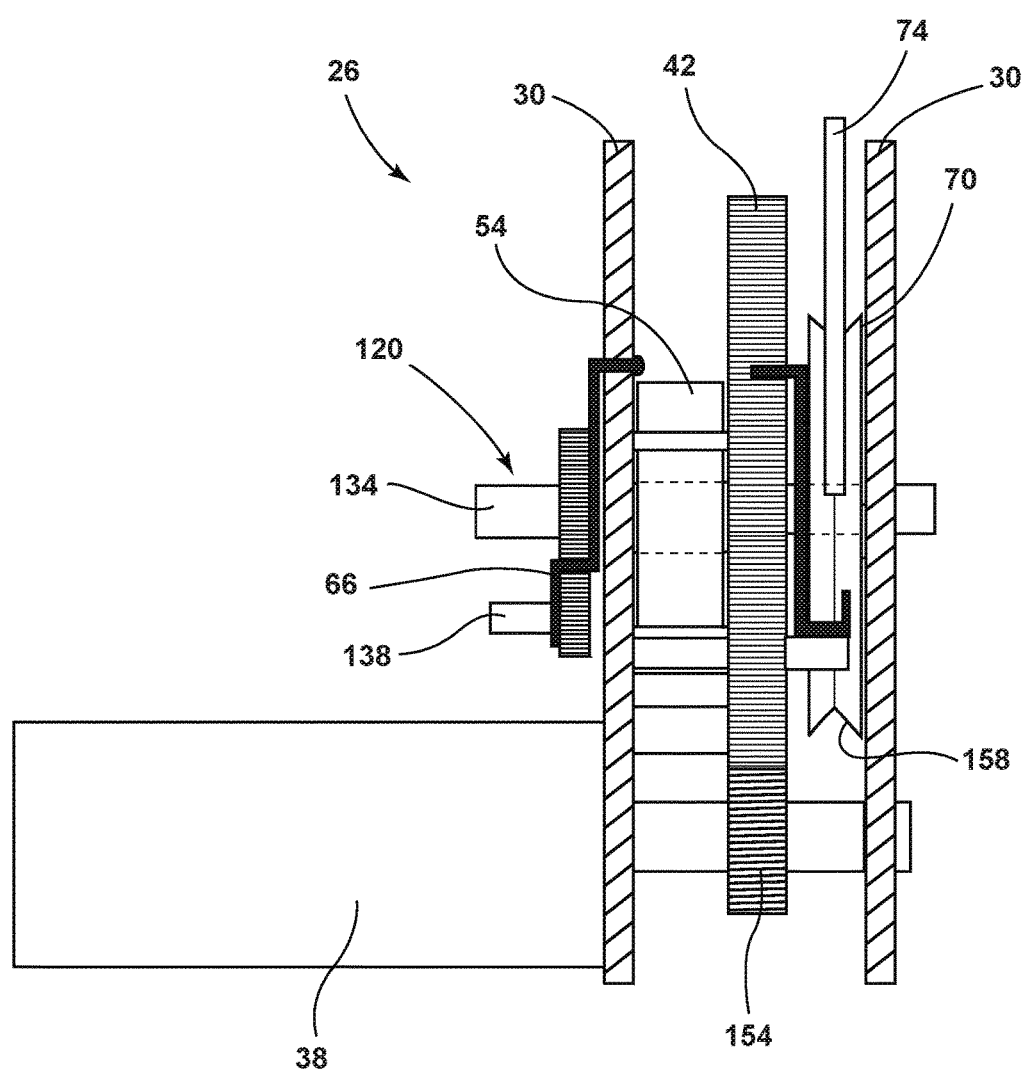
FIG. 4 is a front perspective view of the actuator shown in FIG. 3.

Referring to FIG. 4 a front perspective view of the actuator 26 is shown where the gear 42 is meshed with a motor pinion 154 within the housing 30. The axle 134 is shown extending through the housing 30, the gear 42, and the pulley 70. The pulley 70 has a v-groove 158 where the lifting cable 74 is positioned and wound onto the pulley.

Figure 5A:
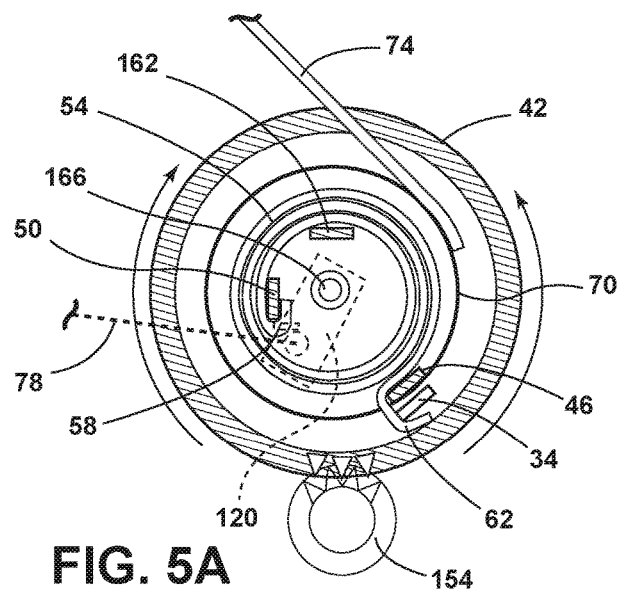
FIG. 5A is a partially schematic fragmentary side view of a portion of the actuator shown in FIG. 3, illustrating the home position.

Referring to FIG. 5A, a partially schematic fragmentary side view of a portion of the actuator 26 is shown with the actuator return spring 54 in a home position. When the seatback 18 (FIG. 1) is in a locked position, the seatback is in either a folded or upright position, the actuator return spring 54 will be in the home position. The "home position," as defined herein, is the position where the second hook 62 of the actuator return spring 54 may be in contact with both the housing tab 34 and the gear tab 46. In addition, the "home position" is where the lifting cable 74 is taut against the seatback 18 in a folded position where any lifting cable 74 pull will cause the seatback 18 to lift. The actuator return spring 54 additionally has the first hook 58 coupled to the spring tab 50. In the home position, the actuator return spring 54 has a residually stored baseline spring energy value. The release cable 78 is used to manually adjust the vehicle seating assembly 10 (FIG. 1) and is coupled to the actuator release 120 of the actuator 26. The lifting cable 74 used to pull up the seatback 18 may be coupled to the pulley 70 of the actuator 26. A second spring tab 162 is positioned 90° away from the spring tab 50 and can be in contact with the actuator return spring 54. The motor pinion 154 is operably coupled to the gear 42 so that the actuator 26 may be rotated clockwise or counterclockwise depending on the desired seatback 18 position.

Figure 5B:
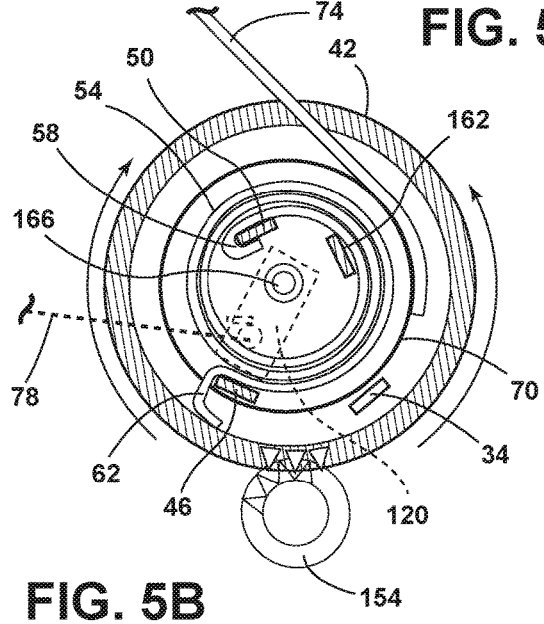
FIG. 5B is a partially schematic fragmentary side view of a portion of the actuator shown in FIG. 3, illustrating the non-tensioned rotated state.

When the seatback 18 (FIG. 1) is in a folded position, the passenger may activate the actuator switch 102 (FIG. 1) to energize the actuator 26 and raise the seatback 18. Upon initiation of the actuator 26, the motor pinion 154 will rotate the gear 42 and the coupled pulley 70 clockwise as denoted in FIG. 5B. As the gear 42 and the pulley 70 rotate clockwise, the lifting cable 74 is wrapped around the pulley 70 which in turn pulls up the seatback 18 to a raised or reclined position. When the seatback 18 reaches the recliner hearts 22 position, the passenger may release the actuator switch 102 to deactivate the actuator 26 and stop rotation of the gear 42 and the pulley 70. After deactivation of the actuator 26, when the seatback 18 is in a desired raised position, the recliner hearts 22 will have relocked while the actuator return spring 54 is in the rotated but unwound position as shown in FIG. 5B. The actuator return spring's 54 rotated but unwound position will then be automatically rotated back to the home position shown in FIG. 5A by a control module or a microcontroller that will spin the gear 42 and the actuator release 120 counterclockwise back to the home position while the pulley 70 remains in place with unwinding of an internal pulley spring (not shown).

The passenger may alternatively choose to raise the seatback 18 manually. By raising the seatback 18 until the unlocked recliner hearts 22 reach their first-locked position, the seatback 18 will re-latch. As the seatback 18 is raised, the lifting cable 74 slack will be wound around the pulley 70 through the residual internal pulley spring (not shown) energy. As described herein, the ability of the passenger to raise or fold the seatback 18 of the vehicle seating assembly 10 can be alternatively achieved through the powered actuator 26 or manually as typical with a discontinuous recliner. In some embodiments, the seatback 18 can be partially raised by the actuator 26 and then finished being raised manually. In other embodiments, the seatback 18 can be partially raised by the actuator 26 and then manually returned to the folded position by pushing down on the partially raised seatback 18. This is possible due to the high geartrain efficiency that will allow the lift motor 38 to be back-driven to the folded position.

Figure 5C:
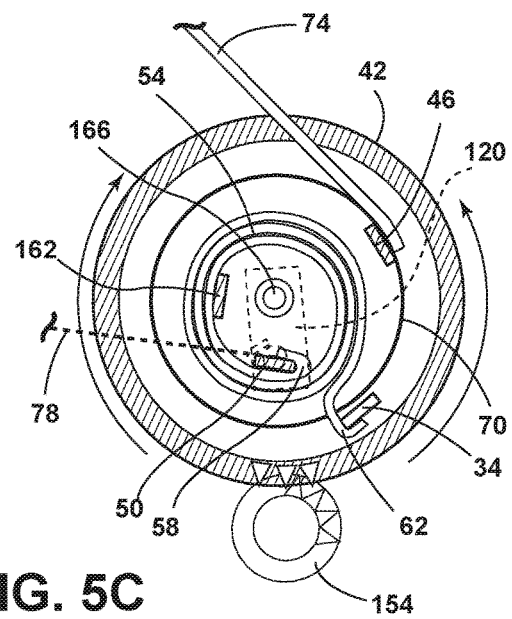
FIG. 5C is a partially schematic fragmentary side view of a portion of the actuator shown in FIG. 3, illustrating the tensioned rotated state.

Referring to FIG. 5C, a partially schematic fragmentary side view of a portion of the actuator 26 is shown with the actuator return spring 54 in a rotated and wound position. When the seatback 18 (FIG. 1) is in an upright locked position, the passenger may activate the actuator switch 102 (FIG. 1) to energize the actuator 26 and lower the seatback 18. Upon initiation of the actuator 26 in the "home" position as shown in FIG. 5A, the recliner hearts 22 (FIG. 2) will unlock and the motor pinion 154 will rotate the gear 42 counterclockwise as denoted in FIG. 5C. As the gear 42 rotates counterclockwise, the lever 66 (FIG. 4) or the spring tab 50 may be triggered to pull on the actuator release 120 and release cable 78 to unlock the recliner hearts 22 that have a spring that will fold the seatback 18 to a lowered or fully folded position. As the seatback 18 folds forward (from the recliner hearts 22 being unlocked) the lifting cable 74 is unwound from around the pulley 70 which in turn offers slack to the seatback 18 to a lowered or fully folded position. When the seatback 18 recliner hearts 22 are unlocked and the seatback 18 begins to fold, the passenger may release the actuator switch 102, or activate a control module (not shown) to deactivate the actuator 26 and stop rotation of the gear 42 and the pulley 70. After deactivation of the actuator 26 when the seatback 18 is in a desired lowered or fully folded position, the actuator return spring 54 is in a rotated and wound position as shown in FIG. 5C. The wound actuator return spring 54 will unwind itself to return the gear 42 to its home position shown in FIG. 5A.

In some embodiments, the passenger may alternatively choose to manually lower the seatback 18 by pulling on the release handle 104 (FIG. 1) to unlock the recliner hearts 22 directly. As described herein, the ability of the passenger to lower or fold the seatback 18 of the vehicle seating assembly 10 can be alternatively achieved through the actuator 26 or manually as a discontinuous recliner.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seating assembly, comprising:
   a seat base;
   a seatback;
   a recliner heart rotatably coupling the seat base and the seatback, wherein the recliner heart is operable between locked and unlocked states; and
   an actuator comprising:
      a housing defining a housing tab;
      a motor;
      a gear operably coupled to the motor, the gear defining a gear tab and a spring tab;
      an actuator return spring defining a first hook and a second hook, the first hook coupled to the spring tab;
      a lever coupled to the gear;
      a pulley coupled to the gear;
      a lifting cable coupled between the pulley and the seatback; and
      a release cable coupled between the lever and the recliner heart, wherein the release cable is configured to transition the recliner heart between the locked and unlocked states,
      wherein the motor is configured to rotate the pulley such that the lifting cable winds around the pulley and moves the seatback from a folded to an unfolded position.

2. The vehicle seating assembly of claim 1, wherein the motor is a back-drivable motor.

3. The vehicle seating assembly of claim 1, wherein the actuator return spring is pretensioned.

4. The vehicle seating assembly of claim 1, wherein the gear is a spur gear.

5. The vehicle seating assembly of claim 1, wherein the seatback is operable between folded and non-folded configurations.

6. The vehicle seating assembly of claim 5, wherein the lifting cable is configured to transition the seatback from the folded to the non-folded configuration.

7. The vehicle seating assembly of claim 5, wherein the motor is configured to drive the gear in at least two directions.

8. A vehicle seating assembly, comprising:
   a seat base;
   a seatback;
   a recliner heart rotatably coupling the seat base and the seatback; and
   an actuator comprising:
      a motor;
      a pulley operably coupled to the motor; and
      a lifting cable coupled between the pulley and the seatback,
      wherein the motor is configured to rotate the pulley such that the lifting cable winds around the pulley and moves the seatback from a folded to an unfolded position.

9. The vehicle seating assembly of claim 8, wherein the actuator further comprises:
   a gear coupled between the motor and the pulley.

10. The vehicle seating assembly of claim 9, wherein the actuator further comprises:
    an actuator return spring coupled to the gear.

11. The vehicle seating assembly of claim 8, wherein the motor is a back-drivable motor.

12. The vehicle seating assembly of claim 8, wherein the actuator further comprises:
    a lever operably coupled with the motor; and
    a release cable coupled between the lever and the recliner heart, wherein the release cable is configured to transition the recliner heart between locked and unlocked states.

13. A vehicle seating assembly, comprising:
    a seat base;
    a seatback;
    a recliner heart rotatably coupling the seat base and the seatback; and
    an actuator comprising:
       a motor having an axle extending through a gear wherein the axle is coupled to a reaction pin and the gear is coupled to a lever; and
       a release cable coupled between the lever and the recliner heart,
       wherein the motor rotates the reaction pin to press against the lever to pull the release cable and transition the recliner heart from a locked to an unlocked state.

14. The vehicle seating assembly of claim 13, wherein the gear is a spur gear.

15. The vehicle seating assembly of claim 14, wherein the actuator further comprises:
    a pulley coupled to the gear.

16. The vehicle seating assembly of claim 15, wherein a cable is coupled between the pulley and the seatback.

17. The vehicle seating assembly of claim 16, wherein the cable is configured to move the seatback from a folded position to an unfolded position.

18. The vehicle seating assembly of claim 17, wherein the motor is configured to drive the gear in at least two directions.

19. The vehicle seating assembly of claim 18, wherein the actuator further comprises:
    an actuator return spring coupled between the gear and a housing of the actuator.

* * * * *